United States Patent [19]

Brodin

[11] 4,192,419
[45] Mar. 11, 1980

[54] CONVEYOR

[75] Inventor: Nils H. Brodin, Hässleholm, Sweden

[73] Assignee: Henning Brodin, Olofstrom, Sweden

[21] Appl. No.: 886,320

[22] Filed: Mar. 13, 1978

[30] Foreign Application Priority Data

Mar. 15, 1977 [SE] Sweden .................. 7702895

[51] Int. Cl.² ................. B65G 25/00; B65G 27/16
[52] U.S. Cl. .................................. 198/750; 198/767;
198/768
[58] Field of Search ................. 198/750, 767, 768;
91/342, 398, 444, 405; 92/132

[56] References Cited

U.S. PATENT DOCUMENTS

| 2,802,336 | 8/1957 | Ball ....................................... 198/768 |
| 3,183,788 | 5/1965 | Olsson .................................. 91/342 |
| 3,212,630 | 10/1965 | Allen et al. ......................... 198/768 |
| 3,336,841 | 8/1967 | Fontaine ............................. 91/396 |

Primary Examiner—Robert B. Reeves
Assistant Examiner—Brian M. Bond
Attorney, Agent, or Firm—Edwin E. Greigg

[57] ABSTRACT

A conveyor having a frame, a piston and cylinder unit operable by means of pressure fluid and secured in the frame, a spring assembly for actuation of the piston, a holder mounted on the frame and reciprocable by means of the piston and cylinder unit and carrying a conveyor path for receiving articles. The piston and cylinder unit has inlet and outlet valves and throttle means at the outlet of the outlet valve. A control rod connected to the piston of the piston and cylinder unit is adapted to allow control of the cross-sectional passage area of the throttle means. The control rod has a back-off section which merges into the full diameter of the rod at one end over a long distance and at the other end over a considerably shorter distance. The conveyor permits moving articles by a throwing movement also along a slightly upwardly inclining conveyor path.

8 Claims, 5 Drawing Figures

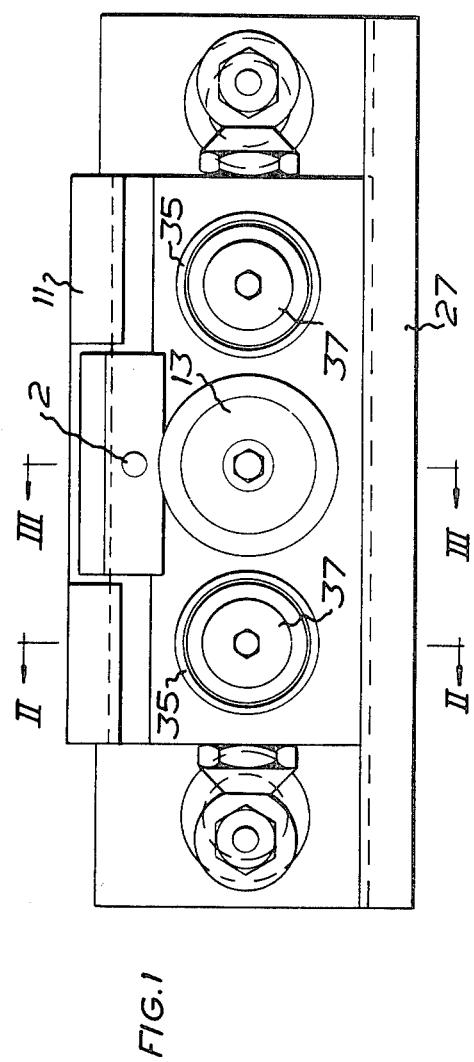
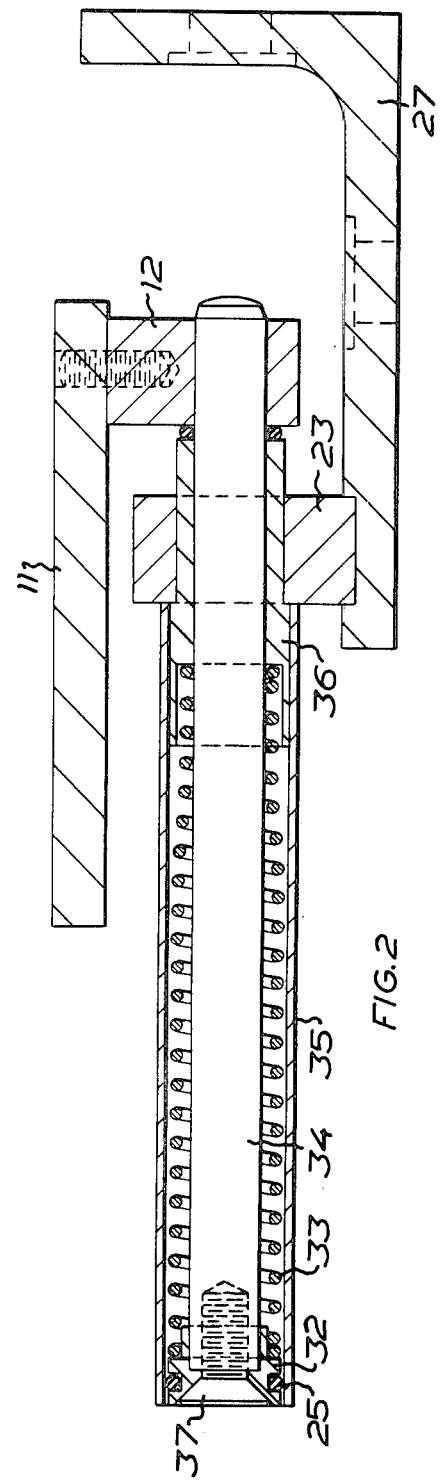
FIG.1
FIG.2

CONVEYOR

The present invention relates to a conveyor having a frame to be anchored to a base, a piston and cylinder unit secured in the frame, a holder mounted on the frame and reciprocable by means of the piston and cylinder unit, the holder being connected to a path or channel for receiving articles and transporting them by the reciprocating movement.

In the engineering industry, problems are often encountered when articles are to be transported from a treatment station to a receiving station or other treatment station if but a restricted space is available. It is thus difficult, if not impossible, to install an effective roller or belt conveyor in conjunction with eccentric or like presses, and therefore the articles must often be moved by hand. Attempts have been made to use vibratory conveyors which, however, suffer from the drawback of suddenly reversing their conveying direction, implying that the articles may be returned to the treatment station, causing damage therein. Besides, vibratory conveyors operate with a very high sound level, for which reason they are doubtful also from the viewpoint of labour safety.

The object of this invention is to provide a conveyor of very small dimensions, which nevertheless very effectively moves articles from one place to another and also is of very silent operation.

To this end, the piston of the piston and cylinder unit is movable in the cylinder from a first position to a second position by pressure medium under tensioning of spring means adapted to at least contribute to returning the piston to the first position, and the piston is adapted to control inlet and outlet valves for the pressure medium so that the supply of pressure medium is suddenly interrupted when the piston reaches the second position, and so that the pressure medium in the cylinder is delivered at first slowly and then ever more rapidly when the piston is moved by the action of the spring means from said second position to said first position in which the outlet valve is suddenly closed and the inlet valve is opened.

An embodiment of the invention will be described in greater detail hereinbelow with reference to the accompanying drawings in which:

FIG. 1 is a end view of a conveyor according to the invention, the conveyor path or channel proper having been removed to avoid crowding of the drawings;

FIG. 2 is a section on line II—II in FIG. 1;

Figure 3:
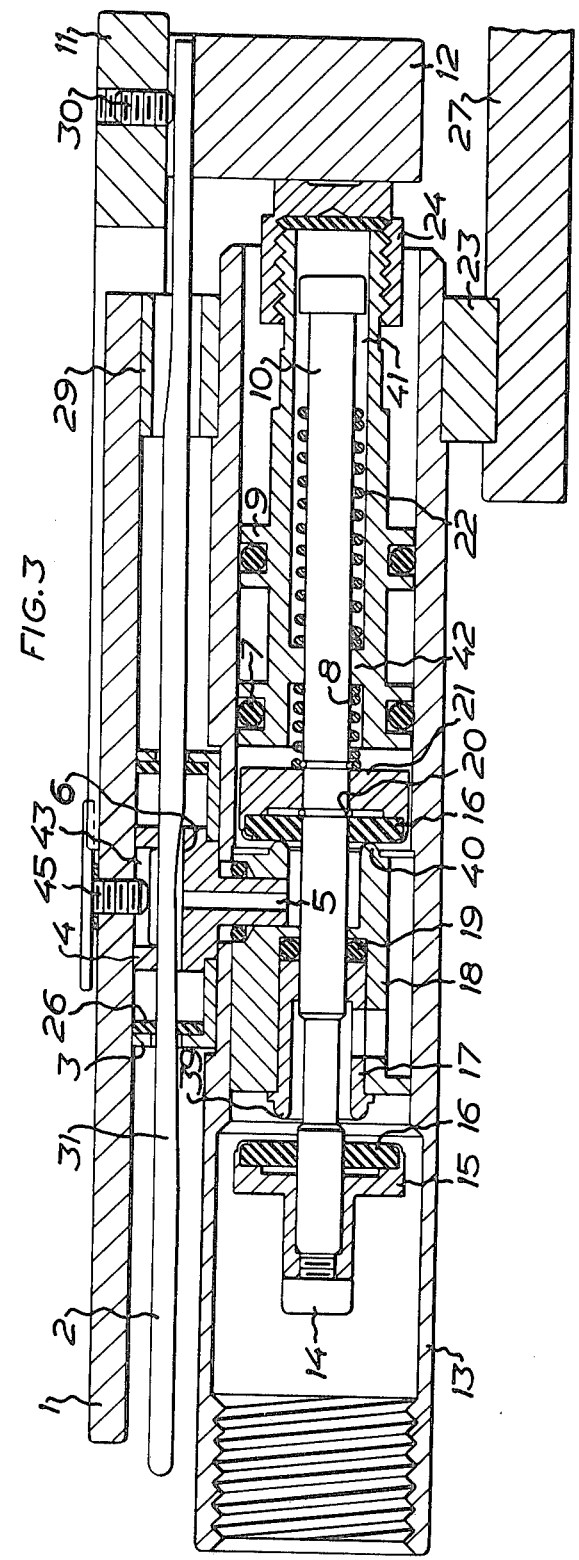
FIG. 3 is a section on line III—III in FIG. 1.
Figure 4:
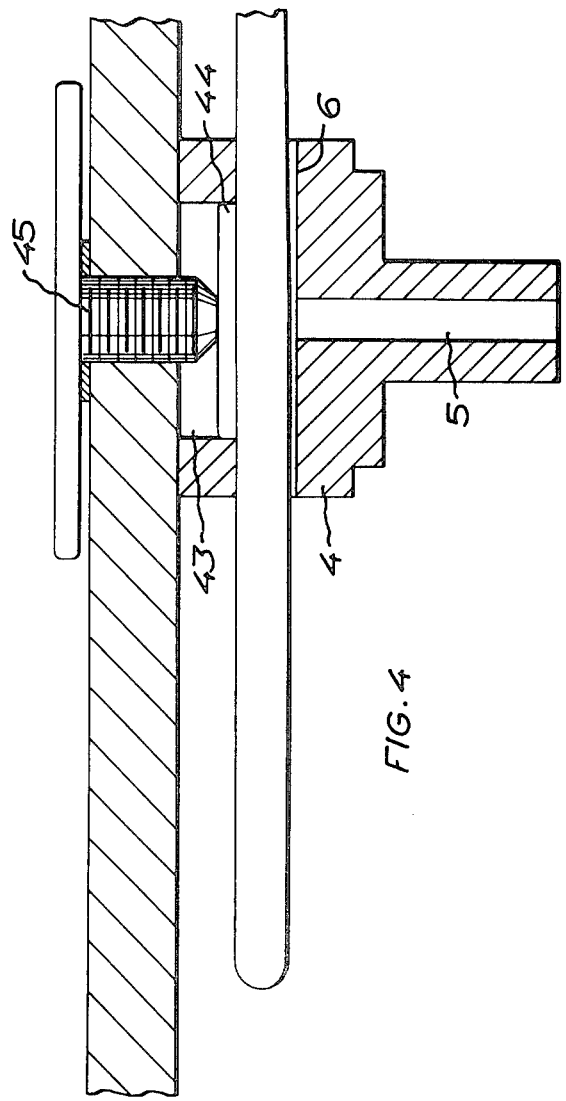
Figure 5:
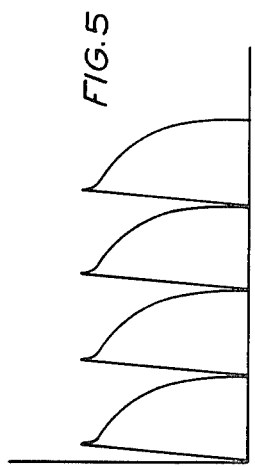

FIG. 4 on a larger scale shows a part of the conveyor in FIG. 3, but in another position;

FIG. 5 graphically illustrates the movement of a conveyor path driven by the apparatus of the invention, as a function of time.

The illustrated conveyor comprises a fastening means in the form of an angular bracket 27 intended to be secured to e.g. a press table. A supporting means 23 is fixedly connected to the angular bracket 27 and in turn carries a piston and cylinder unit with associated valves, shown in the center of FIG. 1, and sleeves 35 arranged on either side of the piston and cylinder unit. Pins 34 are movable in the sleeves 35 and said pins are connected with each other and with the piston by means of a yoke member 12 which in turn carries a holder 11. The conveyor path or channel (not shown) is rigidly connected to said holder 11 and extends along it, as this holder is viewed in FIGS. 2 and 3. The conveyor path or channel will thus be reciprocated in concert with the movement of the piston of the piston and cylinder unit and that of the pins 34 in the sleeves 35, respectively.

The piston and cylinder unit, illustrated more in detail in FIG. 3, is utilized to reciprocate the holder 11 and thus the conveyor path or channel. Said unit comprises a cylinder 13 in which a piston 9 of considerably smaller length than that of the cylinder 13 is reciprocable. The piston 9 is sealed in relation to the cylinder wall by means of O-rings 7. The piston 9 has an axial bore 41 in which an annular shoulder 42 is formed at some distance from the left end of the piston 9, as viewed in FIG. 3. A shaft 10 extends through the bore 41 of the piston 9 and projects a considerable distance to the left in FIG. 3. On this projecting part the shaft 10 carries valve closure members 15 and 21, which are spaced axially apart and have packings 16 in their facing sealing surfaces. Between the valve closure members 15 and 21 a valve housing 18 is sealingly and immovably connected to the inner surface of the cylinder 13. The shaft 10 is supported in the valve housing 18 partly by the housing itself and partly by a nipple 17 axially arranged in the housing and also forming the valve seat 39 of the valve closure member 15. The nipple 17 is sealed in relation to the shaft 10 by means of an O-ring 19. Coaxially with the valve seat 39 the valve housing 18 has a second valve seat 40 with which the valve closure member 21 cooperates. Said valve closure member 21 is fixedly connected to the shaft 10 by means of locking rings 20 on either side of the valve closure member, while the valve closure member 15 is fixed to the end of the shaft remote from the piston 9 by means of a screw 14 which engages in the shaft end.

The seat 40 embraces an opening of somewhat larger diameter than that of the shaft 10, said opening being connected to a bore which extends at right angles to the shaft direction and in which a throttle means 4 is fixed. The throttle means has a passage 5 extending coaxially with said bore and opening into a transverse passage 6 which runs in parallel with the shaft 10 and through which extends a control rod 2. At the right-hand end, as viewed in FIG. 3, the control rod 2 is connected to the yoke member 12 by means of a screw 30. As earlier mentioned, the yoke member 12 is connected to the piston 9 by a connecting element 24. When the piston 9 is reciprocated, the control rod 2 is thus also moved back and forth. The control rod 2 at its underside has a milled section 31 which reduces the cross-sectional area of the rod 2. This milled rod section of reduced cross-sectional area is of a predetermined length and, as appears from FIG. 3, said section at the front end approaches the full dimension of the rod gradually, whereas it more abruptly merges into the full cross-section at the rear end. The passage 6 into which the rod 2 penetrates is of a slightly larger cross-sectional dimension (say 0.1 mm) than the rod which therefore is readily movable in the passage and with the aid of the recessed section 31 is able to regulate the free cross-sectional area of the passage. The throttle means 4 upstands from the upper surface of the cylinder and is there encircled by a cylindrical sound damping device 3 which has a bottom member connected to the outer wall of the cylinder, and an internal covering 26 of sound damping material. The rod 2 extends through opposite openings in the sound damping device 3 and the covering 26. A plate 1 is sealingly fixed on top of the throttle means 4 and the sound damping device 3, and one end of said plate 1 protrudes freely while the other end thereof is connected to the outer side of the cylinder wall by means of a fastening element 29. The plate 1 above the throttle means 4 has a threaded opening into which is screwed a screw 45. In its upper side the throttle means 4 has a recess 43 with a washer 44 therein, against which bears the end of the screw. With the aid of said screw the throttle means 4 can be so actuated as to change the dimension of the passage 6, whereby the rate of movement of the piston 9 and thus the conveyor path can be varied. In the bore of the piston 9 there is arranged a spring 8 on the side of the shoulder 42 facing the valve closure member 21, while a spring 22 is arranged on the opposite side of the shoulder 42. The function of the springs 8 and 22 will appear from the following.

The sleeves 35 disposed on either side of the piston and cylinder unit are fixed to the angular bracket 27 by means of the connecting element 23 and, as already mentioned, each sleeve houses a pressure spring 33. A pin 34 connected to the piston 9 by means of the yoke member 12 penetrates into each sleeve 35. The pins are mounted in their sleeves by a bushing 36 at one end of the sleeve and a washer 32 at the other end of the sleeve, said washer being connected to the pin 34 by means of a screw 37. The outer dimension of the washer 32 is smaller than the inner dimension of the sleeve 35, and the washer engages the inner surface of the sleeve via an O-ring 25. The spring 33 in the sleeve 35 at one end bears against the washer and at the other end against the inwardly facing surface of the bushing 36. It appears from FIG. 2 that if the pin 34 is moved to the left the washer will be moved into the sleeve 35 under tensioning of the spring 33.

The apparatus described above functions in the following manner. It is assumed that the angular bracket 27 is mounted on a supporting surface and that a conveyor channel is secured to the holder and extends longitudinally of the cylinder 13 and the sleeve 35, respectively. A compressed air line is connected to the left end of the cylinder 13, as viewed in FIG. 3. The conveyor channel carries articles e.g. of metal to be transported. The piston and the valves occupy the position shown in FIG. 3. Compressed air which is now supplied through the compressed air line will pass the valve closure member 15 because the inner dimension of the cylinder is larger than the outer dimension of the valve closure member 15. The valve closure member 15 is spaced from the seat 39 for which reason the compressed air flows through the seat into the axial opening of the nipple 17 and from there through a passage 28 which extends through the wall of the nipple 17 and that of the valve housing 18 and continues to the right past the valve closure member 21 the outer dimension of which is also smaller than the inner dimension of the cylinder. Thus the compressed air reaches the left end of the piston 9 and said piston is thereby moved rapidly to the right. As indicated in FIG. 3 the spring 22 is shorter than the space in which it is located, and for that reason it offers at first no resistance to said movement to the right of the piston 9. After the piston 9 has travelled a certain distance the right end of the spring 22, however, reaches the shoulder 14 on the shaft 10 (said shoulder is formed by a screw head) and thus begins to be tensioned. Having been tensioned to a certain degree, the spring actuates the shaft 10 so that the shaft is rapidly moved to the right, implying that the valve closure member 15 fixedly connected to said shaft is brought into contact with its seat 39, whereby the supply of compressed air suddenly ceases and the movement of the piston 9 is stopped. When the shaft 10 is moved to the right the valve closure member 21 is also moved to the right so that the valve formed by the seat 40 and the valve closure member 21 is opened and the compressed air contained in the cylinder can start escaping. At the movement of the piston 9 to the right the control rod 2 has also been moved to the right so that the left end of the milled section 31, that is the point where the section merges into the full cross-section of the rod, is located in the transverse passage 9 above the passage 5. This implies that the escape of air through the seat 40 is throttled. At the movement of the piston 9 to the right the springs 33 in the sleeves 35 have also been tensioned and they now carry out a return movement of the piston 9 to the left. The movement is restricted as the flow of the compressed air into the passage 6 is throttled, but it will be realized that according as the piston 9 moves to the left the cross-sectional outlet area of the passage 6 will increase and the movement of the piston 9 will accelerate, that is, the initially slow movement of the piston 9 and thus of the conveyor channel is accelerated after a predeterminable period to a rate corresponding for instance to the piston speed in the opposite direction. When the piston 9 begins to approach the position, shown in FIG. 3, the spring 8 is tensioned against the rear of the valve closure member 21 and when the spring has reached a predetermined tension it moves the valve closure member 21 to the left together with the shaft 10. At this moment the the discharge of compressed air through the passage 6 also abruptly ceases and compressed air again begins to enter through the seat 39, a new cycle being thus initiated. Since the milled section 31 at the right end of the rod 2 merges into the full cross-section of the rod 2 over a much shorter distance than at the left end of the rod, the acceleration of the piston takes place to maximum speed in this position, as is graphically illustrated in FIG. 5, which shows the movements of the piston 9 and of the conveyor channel as a function of time.

By the described movement, graphically illustrated in FIG. 1, of the piston 9 and the parts fixedly connected therewith the articles in the conveyor channel will be safely conveyed in one direction. The channel accelerates from standstill relatively slowly in a forward direction until a maximum speed is attained, whereupon the movement of the channel is reversed and the channel immediately moves at maximum speed in the opposite direction. The movement will be some kind of a throwing movement by which one can even cause the articles to move along an upwardly inclined path (a maximum of about 8° upward inclination). By screwing down the screw 45 the dimension of the passage 6 is reduced at right angles to the milled section 31 of the rod 2, resulting in a smaller air quantity being delivered when the left end of the section 31 reverses its direction of motion in the passage 6, making the acceleration slower, i.e. the channel reaches its maximum speed in a longer time. With the screw 45 screwed to the bottom the movement of the piston and thus of the channel comes to a standstill. The conveyor operates very reliably and effectively. As the consumption of compressed air furthermore is extremely low and the sound of escaping compressed air is effectively dampened, the conveyor according to the present invention involves a considerable technical advance.

What I claim and desire to secure by Letters Patent is:

1. A conveyor comprising a frame to be anchored to a base, a piston and cylinder unit secured in said frame, a holder mounted on said frame and reciprocable by means of said piston and cylinder unit, a conveyor channel for receiving articles and for conveying said articles by said reciprocating movement, said piston being movable in said cylinder from a first position to a second position by pressure medium, spring means adapted to be tensioned at said movement of the piston from said first position to said second position and to contribute to returning said piston from said second position to said first position, inlet and outlet valves for said pressure medium, means connected to the piston to control the inlet and outlet valves for the pressure medium so that the supply of pressure medium is suddenly interrupted when the piston reaches said second position and pressure medium contained in said cylinder is discharged at first slowly and then ever more rapidly when the piston is moved by the action of the spring means from said second position to said first position in which the outlet valve is suddenly closed and the inlet valve is opened.

2. A conveyor as defined in claim 1 comprising a longitudinally reciprocatory shaft on which said piston is movably mounted and on which the valve closure members of the inlet and outlet valves are fixedly mounted, and springs arranged on said shaft to actuate the valve closure members.

3. A conveyor as defined in claim 2 comprising means defining in said piston an axial bore of larger diameter than that of the shaft, an annular shoulder in said bore, a first actuating spring operative between said annular shoulder and the valve closure member of said outlet valve and urging said valve closure member against the associated seat, a second actuating spring which is non-tensioned when said piston is in said first position and is operative between said annular shoulder and a shoulder on said shaft urging via said shaft said valve closure member of said inlet valve against the associated seat, and said first spring being non-tensioned when said piston is in said second position.

4. A conveyor as defined in claim 1 comprising throttle means disposed in the outlet of said outlet valve, the cross-sectional passage area of said throttle means being controllable by means of a control rod connected to said piston.

5. A conveyor as defined in claim 4, in which the control rod of said throttle means has an elongated backed-off section which at one end merges into the full diameter of said rod over a long distance and at the other end merges into the full diameter of said rod over a considerably shorter distance.

6. A conveyor as defined in claim 1, in which the cylinder of said piston and cylinder unit is extended, said reciprocable shaft passes through said extension and carries in said extension said two valve closure members which are spaced apart and have between them a means connected to the wall of said cylinder extension, said means at one end having a seat cooperating with said valve closure member of said inlet valve and communicating with the piston-containing part of the cylinder, and at the other end having a seat cooperating with said valve closure member of the outlet valve and communicating with the atmosphere through said throttle means.

7. A conveyor as defined in claim 1, in which said spring means for the return movement of said piston consist of springs disposed in respective sleeve means in which engage pins connected to said holder and to said piston, respectively, for guiding purposes and to actuate said springs and to be actuated by them.

8. A conveyor as defined in claim 1 comprising sound damper means arranged about the outlet of said outlet valve.

* * * * *